United States Patent
Chhabra et al.

(10) Patent No.: US 10,757,029 B2
(45) Date of Patent: Aug. 25, 2020

(54) NETWORK TRAFFIC PATTERN BASED MACHINE READABLE INSTRUCTION IDENTIFICATION

(71) Applicant: Trend Micro Incorporated, Tokyo (JP)

(72) Inventors: Vaibhav Chhabra, Austin, TX (US); Josiah Dede Hagen, Austin, TX (US); Brandon Niemczyk, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 290 days.

(21) Appl. No.: 15/870,294

(22) Filed: Jan. 12, 2018

(65) Prior Publication Data

US 2018/0139142 A1 May 17, 2018

Related U.S. Application Data

(63) Continuation of application No. PCT/US2015/042992, filed on Jul. 30, 2015.

(51) Int. Cl.
*H04L 12/851* (2013.01)
*H04L 29/08* (2006.01)
*H04L 29/06* (2006.01)

(52) U.S. Cl.
CPC ........ *H04L 47/2441* (2013.01); *H04L 63/145* (2013.01); *H04L 63/1408* (2013.01); *H04L 67/2819* (2013.01); *H04L 69/22* (2013.01)

(58) Field of Classification Search
CPC ... H04L 47/2441; H04L 69/22; H04L 63/145; H04L 63/1408; H04L 67/2819
See application file for complete search history.

(56) References Cited

U.S. PATENT DOCUMENTS

| | | | | |
|---|---|---|---|---|
| 7,664,048 B1 * | 2/2010 | Yung | ...................... | H04L 41/28 370/235 |
| 8,027,330 B2 * | 9/2011 | Paddon | ............... | H04L 63/0227 370/351 |
| 8,971,196 B2 * | 3/2015 | Degioanni | .......... | H04L 67/1097 370/252 |
| 9,781,139 B2 * | 10/2017 | Sofka | .................. | H04L 63/1416 |
| 9,800,608 B2 * | 10/2017 | Korsunsky | ............. | G06F 21/55 |
| 9,961,001 B2 * | 5/2018 | Kadaba | ................... | H04L 12/56 |
| 10,319,033 B2 * | 6/2019 | Kreider | ................. | G06Q 40/04 |

(Continued)

FOREIGN PATENT DOCUMENTS

JP 2009188885 A 8/2009
KR 10-0862187 B1 10/2008
(Continued)

*Primary Examiner* — Khang Do
*Assistant Examiner* — Geliciano S Mejia
(74) *Attorney, Agent, or Firm* — Okamoto & Benedicto LLP

(57) ABSTRACT

According to an example, network traffic pattern based identification may include analyzing each packet of a plurality of packets that are outgoing from and/or incoming to an entity to respectively determine features within a sequence of outgoing packets and/or a sequence of incoming packets of the plurality of packets. Network traffic pattern based identification may further include analyzing the determined features by respectively using an outgoing packet classification model and/or an incoming packet classification model, and classifying, based on the analysis of the features.

11 Claims, 6 Drawing Sheets

(56) References Cited

U.S. PATENT DOCUMENTS

| 10,320,813 B1* | 6/2019 | Ahmed | H04L 63/1416 |
| 2006/0218447 A1* | 9/2006 | Garcia | H04L 43/10 |
| | | | 714/39 |
| 2012/0210426 A1 | 8/2012 | Yu et al. | |
| 2015/0163330 A1* | 6/2015 | Ni | H04L 63/0245 |
| | | | 370/392 |

FOREIGN PATENT DOCUMENTS

| KR | 10-2009-0083767 A | 8/2009 |
| KR | 10-2015-0019280 A | 2/2015 |

* cited by examiner

300

```
ANALYZE EACH PACKET OF A PLURALITY OF PACKETS
THAT ARE AT LEAST ONE OF OUTGOING FROM AND
INCOMING TO AN ENTITY TO RESPECTIVELY DETERMINE
FEATURES WITHIN AT LEAST ONE OF A SEQUENCE OF
OUTGOING PACKETS AND A SEQUENCE OF INCOMING
PACKETS OF THE PLURALITY OF PACKETS
302
```

```
ANALYZE THE DETERMINED FEATURES BY
RESPECTIVELY USING AT LEAST ONE OF AN OUTGOING
PACKET CLASSIFICATION MODEL AND AN INCOMING
PACKET CLASSIFICATION MODEL
304
```

```
CLASSIFY A SET OF MACHINE READABLE INSTRUCTIONS THAT IS
ASSOCIATED WITH THE FEATURES AS A TYPE OF MACHINE
READABLE INSTRUCTIONS FROM A PLURALITY OF TYPES OF
MACHINE READABLE INSTRUCTIONS
306
```

FIG. 3

NETWORK TRAFFIC PATTERN BASED MACHINE READABLE INSTRUCTION IDENTIFICATION

CROSS-REFERENCE TO RELATED APPLICATION

This application is a continuation of International Application No. PCT/US2015/042992, with an International Filing Date of Jul. 30, 2015, which is incorporated herein by reference in its entirety.

BACKGROUND

An application may be described as a set of machine readable instructions designed to permit a user to perform a group of coordinated functions, tasks, or activities.

BRIEF DESCRIPTION OF DRAWINGS

Features of the present disclosure are illustrated by way of example and not limited in the following figure(s), in which like numerals indicate like elements, in which:

FIG. 3 illustrates a flowchart of a method for network traffic pattern based machine readable instruction identification, according to an example of the present disclosure;

DETAILED DESCRIPTION

Figure 1:
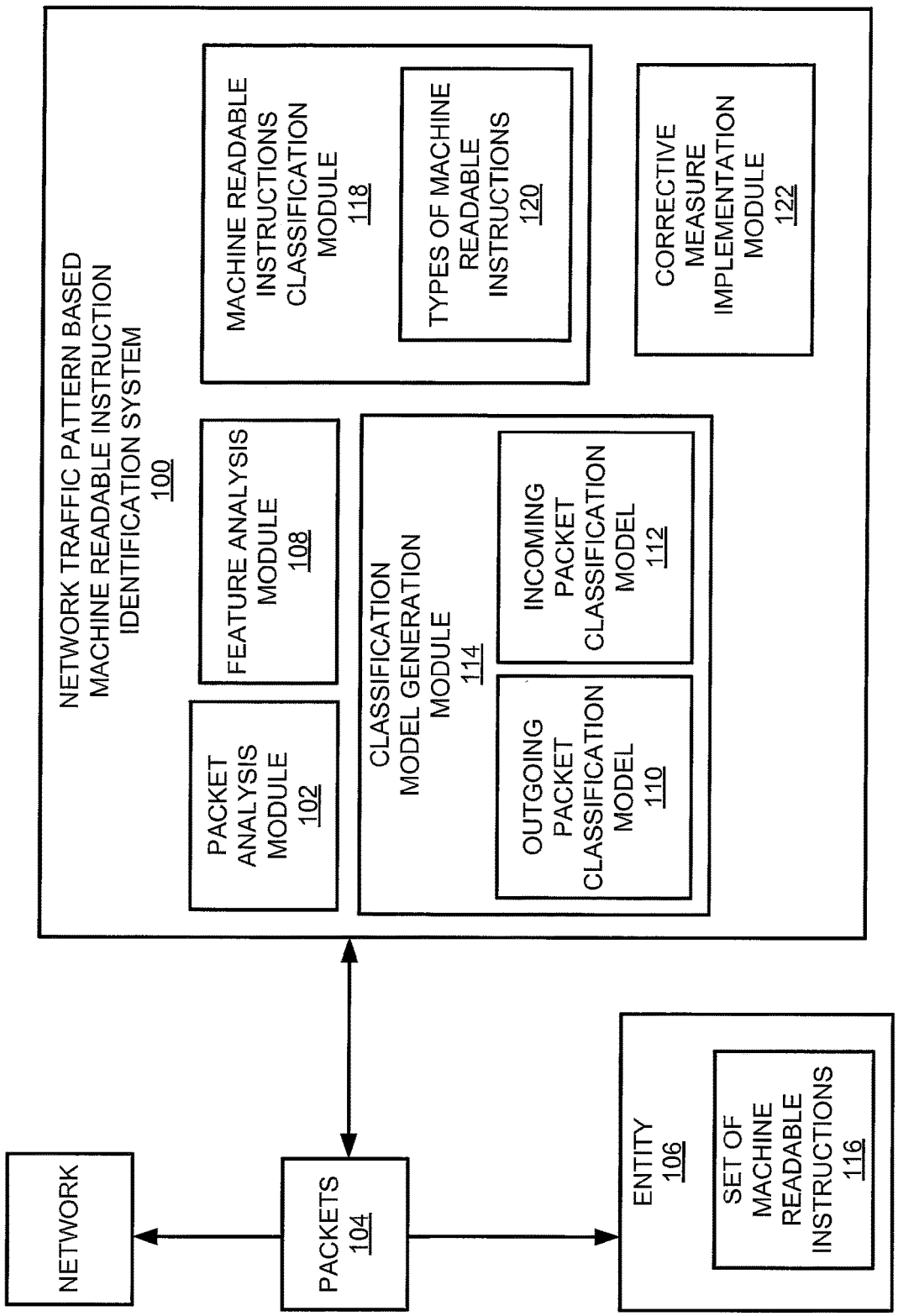
FIG. 1 illustrates an architecture of a network traffic pattern based machine readable instruction identification system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to a set of machine readable instructions that may be present in a memory of a host computer, and related, for example, to an application executing on the host computer, or a set of machine readable instructions that is placed in the memory of the host computer by a process without being related to an application executing on the host computer, knowledge of such a set of machine readable instructions may be needed for a variety of purposes. Non-limiting examples of such a set of machine readable instructions may include machine readable instructions related to a word processor, a video media streaming application, an audio media streaming application, a file transfer application, a spreadsheet design and management application, an aeronautical flight simulator, a console game, a drawing application, a painting application, an illustrating application, a library management application, other types of applications.

Identification of a set of machine readable instructions may be used, for example, for determining whether the set of machine readable instructions is authorized to be used, whether resources that are being allocated to the set of machine readable instructions are being used in an acceptable or unacceptable manner, and for various other types of analysis related to the presence and/or use of the set of machine readable instructions.

Determining information related to a set of machine readable instructions may be needed for determining whether the set of machine readable instructions is authorized or unauthorized for execution on the host computer. Examples of a set of machine readable instructions that is authorized for execution on the host computer may include machine readable instructions related to an audio media streaming application, a video media streaming application, a file transfer application, etc.

Even for an authorized set of machine readable instructions, knowledge of an authorized use of such a set of machine readable instructions may be needed, for example, for network performance maintenance purposes (e.g., by limiting video media streaming, and generally, by limiting usage of such a set of machine readable instructions to an authorized usage).

With respect to an unauthorized set of machine readable instructions, such machine readable instructions may be related, for example, to malware and other such unauthorized types of machine readable instructions that may be placed on a host computer. Examples of a set of machine readable instructions that is unauthorized for execution on the host computer may include malware types such as worms, Trojans, viruses, bots, etc. Knowledge of a type of malware may be used to implement remedial procedures, and to thus minimize or prevent damage to a host computer.

In order to address, for example, the technical challenges related to the knowledge of a set of machine readable instructions, according to examples, a network traffic pattern based machine readable instruction identification system and a method for network traffic pattern based machine readable instruction identification are disclosed herein. The example system and method disclosed herein may provide for the classification of a set of machine readable instructions that reside in a memory, for example, on a host computer, based on network traffic patterns related to the host computer. The set of machine readable instructions may be present in the memory of the host computer, and related, for example, to an application. Alternatively, the set of machine readable instructions may be present in the memory of the host computer, without being related to an application (e.g., a set of machine readable instructions that is placed in memory by a process). As described herein, the set of machine readable instructions may be authorized to be present in the memory and include, for example, machine readable instructions related to audio media streaming, video media streaming, file transfer, etc. Alternatively, the set of machine readable instructions may be unauthorized to be present in the memory and include, for example, malware such as worms, Trojans, viruses, bots, etc.

As described herein, the example of the system and method disclosed herein may analyze network traffic patterns of a set of machine readable instructions on a host computer to classify the set of machine readable instructions, for example, as an authorized or an unauthorized set of machine readable instructions. With respect to classification, a set of machine readable instructions may be classified as an authorized set of machine readable instructions or an unauthorized set of machine readable instructions based, for example, on comparison of the set of machine readable instructions to lists of authorized and unauthorized sets of machine readable instructions, comparison of a network traffic pattern associated with the set of machine readable instructions with approved and disapproved network traffic patterns, an evaluation of a source (e.g., an authorized server) of the set of machine readable instructions, approval or disapproval by an administrator in response to a prompt, machine-learning with respect to authorized and unauthorized types of machine readable instructions, and other such techniques.

With respect to the network traffic patterns, the example of the system and method disclosed herein may analyze packets that are transmitted or received (i.e., outgoing or incoming), for example, from a host computer to a network (or from a network or another computer to the host computer, where the host computer may also be a network), to determine features such as protocols (outgoing and incoming), source and destination Internet Protocol (IP) addresses (relative to a host computer), and source and destination ports. The host computer, the network, and generally, a source and/or a destination of the incoming and/or outgoing packets may be generally designated as an entity.

The features may be used as a feature set by a machine readable instructions classification module that implements a machine learning based classifier model (or a set of machine learning based classifiers) to classify a set of machine readable instructions. As described herein, the machine learning based classifier model may include an outgoing packet classification model and an incoming packet classification model. The outgoing packet classification model may be described as a machine learning based classifier model that is used to classify outgoing packets, and the incoming packet classification model may be described as a machine learning based classifier model that is used to classify incoming packets.

The example of the system disclosed herein may be disposed between the host computer and a network to collect packets transmitted between the host computer and the network, and to analyze the network traffic patterns for the packets transmitted between the host computer and the network. Alternatively or additionally, the example of the system disclosed herein may receive metadata related to the packets transmitted between the host computer and the network to analyze the network traffic patterns. Alternatively or additionally, the example of the system disclosed herein may be provided on the host computer to collect packets transmitted between the host computer and the network, and to analyze the network traffic patterns.

For the example of the system disclosed herein, an example of a machine learning technique that is used to classify a set of machine readable instructions includes a Markov model. An example of a Markov model includes a Markov chain. Other examples of a Markov model include a hidden Markov model (HMM), a hierarchical hidden Markov model (HHMM), and a layered hidden Markov model (LHMM). HMMs may be used independently or jointly in either a HHMM or a LHMM.

Other non-limiting examples of machine learning techniques that may be used to classify a set of machine readable instructions include decision trees, naive Bayes classification, support vector machines (SVMs), logistic regression, neural networks, and other such techniques.

As described herein, the features may be used as a feature set by the machine readable instructions classification module that implements a machine learning based classifier (or a set of machine learning based classifiers) to classify a set of machine readable instructions. A classification model generation module may generate, based on training data, a model for each type of feature (e.g., protocol, IP address, and port), and for whether the feature is related to an incoming or outgoing packet. Thus, with respect to protocols (outgoing and incoming), source and destination IP addresses (relative to a host), and source and destination ports, the classification model generation module may generate six models (e.g., an outgoing protocol transition model, an incoming protocol transition model, a source IP address transition model, a destination IP address transition model, a source port incoming transition model, and a destination port outgoing transition model). Further, with respect to feature attributes such as transitions, counts, probabilities, entropy, etc., of the features (e.g., protocols (outgoing and incoming), source and destination IP addresses (relative to a host computer), and source and destination ports) as disclosed herein, the classification model generation module may generate further models (or sub-models) related to each of the feature attributes. Thus, as disclosed herein, models may be generated with respect to the features, and further models (or sub-models) may be generated with respect to the feature attributes. The models may be generated, for example, based on predetermined lists of models for particular environments of operation of a host computer, types of host computers, approval or disapproval by an administrator in response to a prompt, machine-learning with respect to types of models that are to be used, and other such techniques.

The training data may include, for example, malware that is executed on a host computer in a controlled environment. Alternatively or additionally, the training data may include a benign set of machine readable instructions that are executed on a host computer. Examples of a benign set of machine readable instructions include machine readable instructions related to audio media streaming, video media streaming, file transfer, etc., to ascertain network traffic patterns related to the benign set of machine readable instructions.

The models generated by the classification model generation module may be used to analyze a feature (and/or a feature attribute) related to network traffic patterns of a set of machine readable instructions on a host computer to classify the set of machine readable instructions, for example, as an authorized or unauthorized set of machine readable instructions. Further, the models generated by the classification model generation module may be used to determine sub-classifications related to a type of the authorized set of machine readable instructions or a type of the unauthorized set of machine readable instructions. As described herein, according to examples, the authorized set of machine readable instructions may be sub-classified as audio media streaming, video media streaming, file transfer, etc. The unauthorized set of machine readable instructions may be sub-classified, for example, as a worm, Trojan, virus, bot, etc. The unauthorized set of machine readable instructions may be further sub-classified, for example, as a particular type of worm (e.g., email worm, Internet worm, etc.), Trojan (e.g., file serving, distributed denial, etc.), etc., and yet further, as a particular family (i.e., specific name) of worms, Trojans, viruses, etc. Such authorized or unauthorized set of machine readable instructions may include known and/or unknown types of machine readable instructions (e.g., new types of applications, malware, etc.).

The example of the system and method disclosed herein may thus perform dynamic analysis at a collecting point in a network, without the need to be executed on the host computer executing a set of machine readable instructions. Thus, the example of the system and method disclosed herein may provide for classification of a set of machine readable instructions, without the dependence on an operating system (OS) and/or a version of a set of machine readable instructions that are executing on a host computer. The example of the system and method disclosed herein may also provide for security and privacy with respect to identifying information such as a particular destination IP address, where pseudo-names may be used instead of the actual identifying information.

The unauthorized set of machine readable instructions may be designated, for example, as malware. For the authorized and unauthorized sets of machine readable instructions, the classification may respectively include sub-classifications related to a type of the authorized set of machine readable instructions or a type of the unauthorized set of machine readable instructions. For example, the authorized set of machine readable instructions may be sub-classified as audio media streaming, video media streaming, file transfer, etc. The unauthorized set of machine readable instructions may be sub-classified, for example, as a worm, a Trojan, a virus, a bot, etc. The unauthorized set of machine readable instructions may be further sub-classified, for example, as a particular type of worm (e.g., email worm, Internet worm, etc.), Trojan (e.g., file serving, distributed denial, etc.), etc., and yet further, as a particular family (i.e., specific name) of worms, Trojans, viruses, etc. Such an unauthorized set of machine readable instructions may include known and/or unknown types of machine readable instructions (e.g., new types of malware).

FIG. 1 illustrates an architecture of a network traffic pattern based machine readable instruction identification system (hereinafter also referred to as "system 100"), according to an example of the present disclosure. Referring to FIG. 1, the system 100 is depicted as including a packet analysis module 102 to analyze each packet of a plurality of packets 104 that are outgoing from and/or incoming to an entity 106 to respectively determine features within a sequence of outgoing packets and/or a sequence of incoming packets of the plurality of packets 104. The entity 106 may include any type of device or devices that may transmit and/or receive the packets 104. For example, the entity 106 may include a computer, which may be designated as a host computer, a network, and other such devices. According to examples, the packet analysis module 102 may determine the features by using a network sniffer to dissect the IP headers of a packet.

A feature analysis module 108 may analyze the determined features by respectively using an outgoing packet classification model 110 and/or an incoming packet classification model 112. As described herein, the outgoing packet classification model 110 and the incoming packet classification model 112 may represent machine learning based classification models.

A classification model generation module 114 may generate the outgoing packet classification model 110 and the incoming packet classification model 112 based on a training set of machine readable instructions. As described herein, the training set of machine readable instructions may include malware that is executed on the entity 106 in a controlled environment. Alternatively or additionally, the training set of machine readable instructions may include a benign set of machine readable instructions that are executed on the entity 106 in the controlled environment.

According to examples, the outgoing packet classification model 110 may include a machine learning based outgoing packet classification model, and the incoming packet classification model 112 may include a machine learning based incoming packet classification model. The outgoing packet classification model 110 may be used to classify a set of machine readable instructions 116 with respect to outgoing packets, for example, from the entity 106, and the incoming packet classification model 112 may be used to classify the set of machine readable instructions 116 with respect to incoming packets, for example, to the entity 106.

According to examples, the packet analysis module 102 may analyze each packet of the plurality of packets 104 that are outgoing from and/or incoming to the entity 106 to respectively determine the features to further respectively determine outgoing protocol transitions for outgoing packets of the plurality of packets 104 from the entity 106, and/or incoming protocol transitions for incoming packets of the plurality of packets 104 to the entity 106.

According to examples, the feature analysis module 108 may analyze the determined features by respectively using an outgoing protocol transition model (i.e., included in the outgoing packet classification model 110) related to the outgoing protocol transitions, and/or an incoming protocol transition model (i.e., included in the incoming packet classification model 112) related to the incoming protocol transitions.

According to examples, the packet analysis module 102 may analyze each packet of the plurality of packets 104 that are outgoing from and/or incoming to the entity 106 to respectively determine the features to further respectively determine destination port transitions for outgoing packets of the plurality of packets 104 from the entity 106, and/or source port transitions for incoming packets of the plurality of packets 104 to the entity 106.

According to examples, the feature analysis module 108 may analyze the determined features by respectively using a destination port outgoing transition model (i.e., included in the outgoing packet classification model 110) related to the destination port transitions, and a source port incoming transition model (i.e., included in the incoming packet classification model 112) related to the source port transitions.

According to examples, the packet analysis module 102 may analyze each packet of the plurality of packets 104 that are outgoing from and/or incoming to the entity 106 to respectively determine the features to further respectively determine destination IP address transitions for outgoing packets of the plurality of packets from the entity, and/or source IP address transitions for incoming packets of the plurality of packets 104 to the entity 106.

According to examples, the feature analysis module 108 may analyze the determined features by respectively using a destination IP address transition model (i.e., included in the outgoing packet classification model 110) related to the destination IP address transitions, and/or a source IP address transition model (i.e., included in the incoming packet classification model 112) related to the source IP address transitions.

A machine readable instructions classification module 118 may classify, based on the analysis of the features, the set of machine readable instructions 116 (which, as described herein, may be part of an application, or independent from an application) that is associated with the features as a type of machine readable instructions from a plurality of types of machine readable instructions 120.

According to examples, the machine readable instructions classification module 118 may classify, based on the analysis of the features, the set of machine readable instructions 116 that is associated with the features as the type of machine readable instructions from the plurality of types of machine readable instructions 120 that include an authorized type of machine readable instructions and an unauthorized type of machine readable instructions.

According to examples, the machine readable instructions classification module 118 may classify, based on the analysis of the features, the set of machine readable instructions 116 that is associated with the features as the type of machine readable instructions from the plurality of types of machine readable instructions 120 as an authorized type of machine readable instructions or as malware.

A corrective measure implementation module 122 may determine, based on the classification of the set of machine readable instructions 116 that is associated with the features as the type of machine readable instructions from the plurality of types of machine readable instructions 120, whether to implement corrective measures related to the set of machine readable instructions 116. In response to a determination to implement the corrective measures related to the set of machine readable instructions 116, the corrective measure implementation module 122 may implement the corrective measures related to the set of machine readable instructions 116, for example, to modify further features within a further sequence of outgoing packets and/or a further sequence of incoming packets of a plurality of further packets.

According to examples, each packet of the plurality of packets 104 may be analyzed at a location that is independent of the entity 106, to respectively determine the features within the sequence of outgoing packets and/or the sequence of incoming packets of the plurality of packets 104. In this regard, the system 100 disclosed herein may be implemented on the entity 106, any device or network that sends/receives packets from the entity 106, or independently from the entity 106 and the device or network that sends/receives packets from the entity 106.

The aspect of features as disclosed herein may be described as feature classes that are used to derive other sub-classes related to feature attributes. For example, a base feature set may include protocols (outgoing and incoming), source and destination IP addresses (relative to a host computer), and source and destination ports. These base feature classes of the base feature set may be expanded to other sub-classes related to feature attributes such as transitions, counts, probabilities, entropy, etc. For example, with respect to transitions, a transition feature may represent an explicit feature in the outgoing packet classification model 110 and/or the incoming packet classification model 112. For example, a transition feature may include features such as "transition from DNS to HTTP GET, outgoing". According to examples, with respect to counts, the "count of DNS packets, outgoing", and "count of transitions from DNS to HTTP GET, outgoing" may each represent features. According to examples, with respect to probability, the "probability of DNS packet" and the "probability of a transition from DNS to HTTP GET, outgoing" may each represent features.

According to examples, with respect to entropy, entropy may be applied to an aggregate or super-class, e.g., a feature for "entropy of protocols" and a feature for "entropy of the protocol transitions, outgoing."

For the example of the system 100, counts of feature instances, probabilities of feature transitions, and other metrics such as entropy may be determined for implementation of corrective measures by the corrective measure implementation module 122. For example, counts related to a number of protocols (or source/destination IP address, or source/destination port) may be used to determine which specific protocol (or source/destination IP address, or source/destination port) may be subject to corrective actions. Further, probabilities related to different protocols (or source/destination IP address, or source/destination port) may be used to determine a probability of a specific protocol (or source/destination IP address, or source/destination port) that may be related to malicious behavior (e.g., unauthorized behavior). Similarly, entropy related to a particular protocol (or source/destination IP address, or source/destination port) may be used to determine variations in protocol transitions (or transitions related to source/destination IP addresses, or source/destination ports).

According to examples, with respect to the feature transitions, an example of feature transitions for a particular set of machine readable instructions 116 may include a sequence that includes a Domain Name System (DNS) request, a Hypertext Transfer Protocol (HTTP) request, a HTTP request, a HTTP request, and then a Transmission Control Protocol (TCP) request for outgoing protocol transitions. From these outgoing protocol transitions, an outgoing protocol transition model (i.e., included in the outgoing packet classification model 110) may determine the following probabilities: Initial to DNS=0.2, DNS to HTTP=0.2, HTTP to HTTP=0.4, and HTTP to TCP=0.2. This outgoing protocol transition model may represent a Markov chain, which may be used to generate a HMM, a HMMM, and/or a LHMM as described herein.

According to examples, as described herein, security and privacy may be provided with respect to identifying information such as a particular destination IP address, a protocol, etc., where pseudo-names may be used instead of the actual identifying information. For example, different protocols encountered in outgoing or incoming communications may be numbered (e.g., a feature transition with respect to protocols may be designated as 1 to 2 to 2 to 2 to 3 to 1, where each number may represent a different protocol). Similarly, different IP addresses that are communicated with may be designated in a feature transition sequence as 1 to 1 to 1 to 2 to 3 to 4 to 5 to 6 to 1, where each number may represent a different destination IP address. Similarly, source and destination ports may be represented using numbers, characters, or any types of symbols.

With respect to the corrective measure implementation module 122, the corrective measure implementation module 122 may further provide various functionality such as an intrusion prevention system, security information and event management (SIEM), and/or antivirus protection. With respect to intrusion prevention, the corrective measure implementation module 122 may provide for the monitoring of activities (e.g., traffic to/from the entity 106) for malicious (i.e., unauthorized) activity. In this regard, the corrective measure implementation module 122 may identify malicious activity, log information about the malicious activity, attempt to block/stop the malicious activity, and report the malicious activity. Further, the corrective measure implementation module 122 may quarantine the source/destination of the malicious activity. With respect to STEM functionality, the corrective measure implementation module 122 may provide for real-time analysis of security alerts generated, for example, by the machine readable instructions classification module 118 based on a particular classification of the set of machine readable instructions 116. Further, with respect to antivirus protection, the corrective measure implementation module 122 may provide antivirus functionality to prevent, detect, and remove malicious machine readable instructions (e.g., based on the classification by the machine readable instructions classification module 118).

Figure 2:
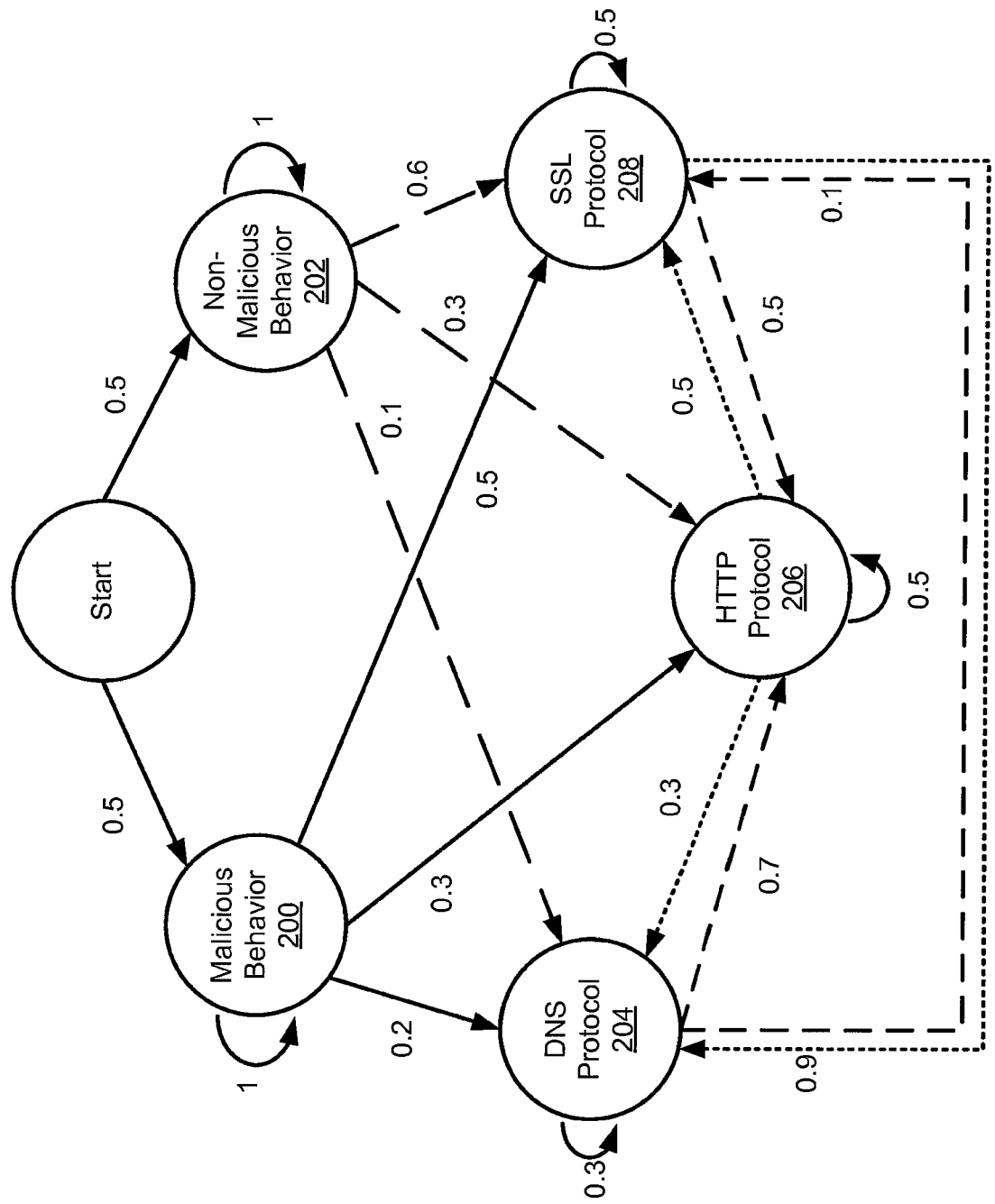
FIG. 2 illustrates a hidden Markov model for the network traffic pattern based machine readable instruction identification system of FIG. 1, according to an example of the present disclosure.

FIG. 2 illustrates a hidden Markov model for the system 100, according to an example of the present disclosure.

Referring to FIG. 2, FIG. 2 illustrates an example where traffic (e.g., network traffic) may include some feature transitions that represent either malicious (i.e., unauthorized behavior) or non-malicious (i.e., authorized behavior). For the example of FIG. 2, each packet analyzed by the packet analysis module 102 may represent a DNS protocol, a HTTP protocol, or a SSL protocol. For the example of FIG. 2, the states "malicious behavior" at 200 and "non-malicious behavior" at 202 may represent hidden states and form the HMM. Protocol transitions between the DNS protocol at 204, the HTTP protocol at 206, and the SSL protocol at 208 may represent the observed states, and represent the likelihood of protocol transitioning. Upon analysis of the packets, different patterns of these protocol transitions may converge to certain transitional probability values, which may be classified as malicious behavior or as non-malicious behavior. For example, there is a 20% chance (represented as 0.2 from 200 to 204) that the observed packet is malicious and has its protocol as DNS. Likewise, there is a 30% chance (represented as 0.3 from 200 to 206) the observed packet is malicious and has its protocol as HTTP, and a 50% chance (represented as 0.5 from 200 to 208) the observed packet is malicious and has its protocol as SSL.

The modules and other elements of the system 100 may be machine readable instructions stored on a non-transitory computer readable medium. In this regard, the system 100 may include or be a non-transitory computer readable medium. In addition, or alternatively, the modules and other elements of the system 100 may be hardware or a combination of machine readable instructions and hardware.

Figure 4:
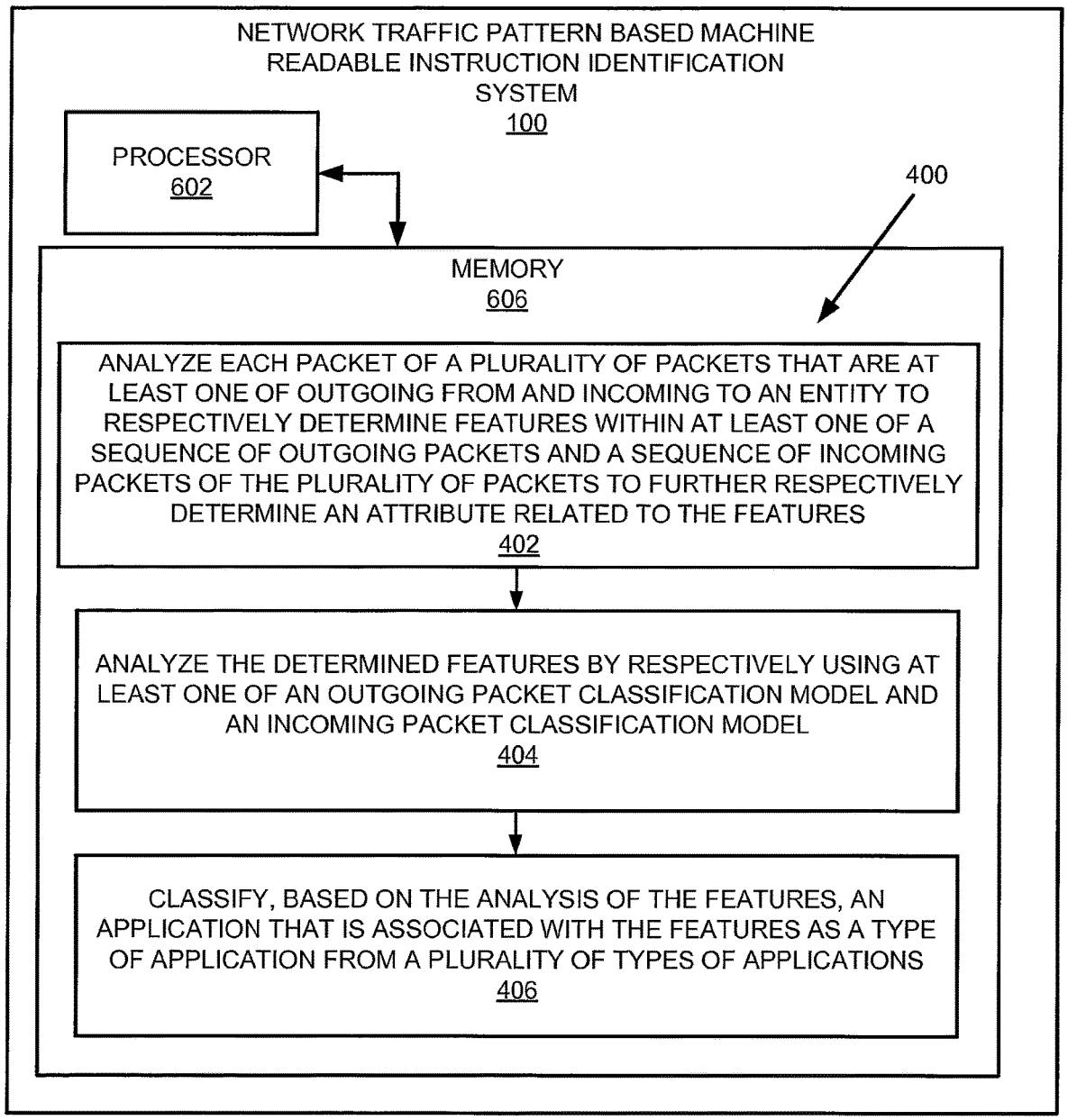
FIG. 4 illustrates a flowchart of the method for network traffic pattern based machine readable instruction identification, according to an example of the present disclosure.
Figure 5:
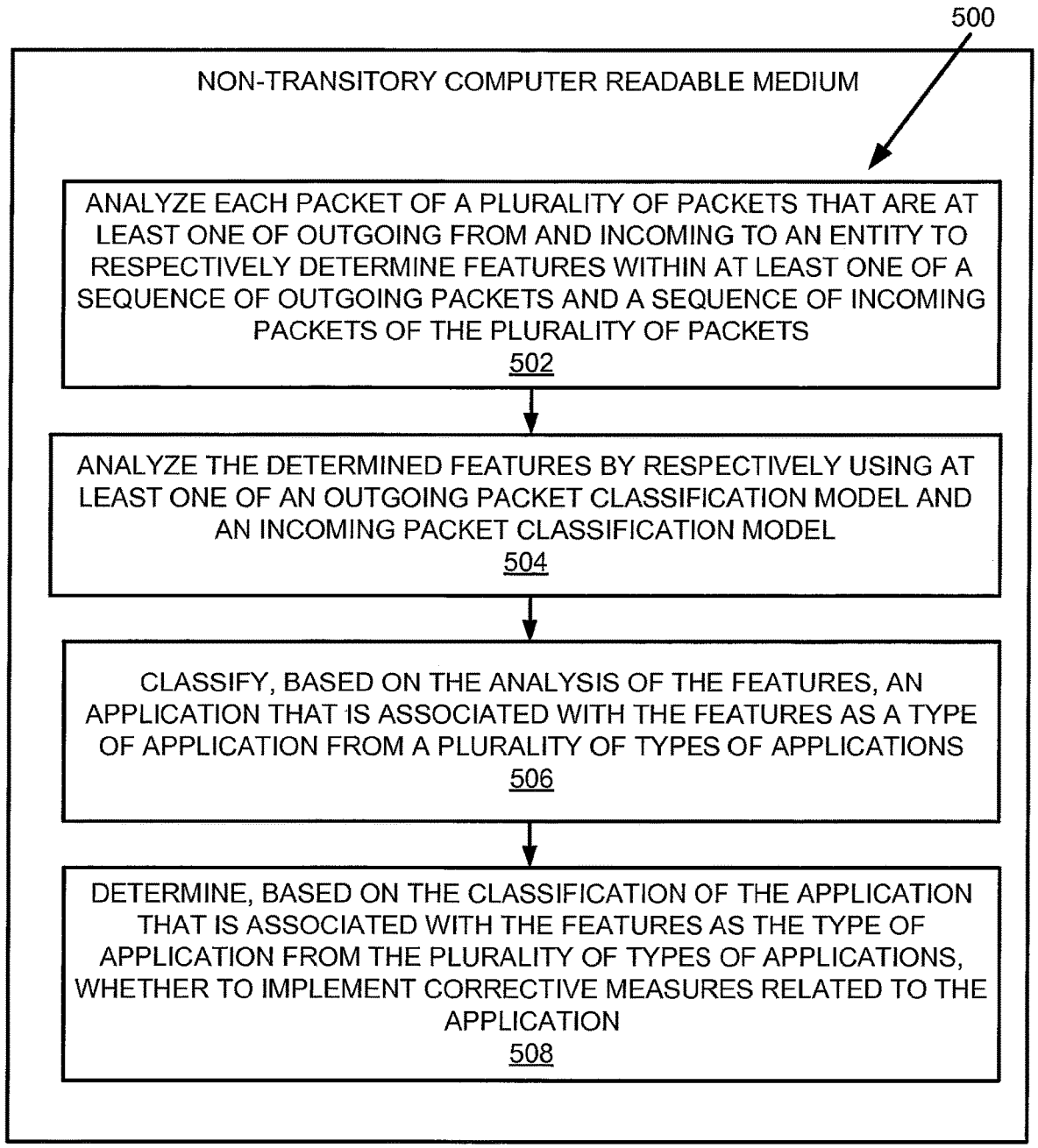
FIG. 5 illustrates a flowchart of the method for network traffic pattern based machine readable instruction identification, according to an example of the present disclosure.

FIGS. 3-5 respectively illustrate flowcharts of methods 300, 400, and 500 for network traffic pattern based machine readable instruction identification, corresponding to the example of the network traffic pattern based machine readable instruction identification system 100 whose construction is described in detail above. The methods 300, 400, and 500 may be implemented on the network traffic pattern based machine readable instruction identification system 100 with reference to FIGS. 1 and 2 by way of example and not limitation. The methods 300, 400, and 500 may be practiced in other systems.

Further, although execution of the methods described herein is with reference to the system 100 of FIG. 1, other suitable devices for execution of these methods will be apparent to those of skill in the art. The methods described in the flowcharts of FIG. 3-5 may be implemented in the form of executable instructions stored on a machine-readable storage medium, such as the memory 606 and/or the secondary data storage 608 of FIG. 6, by one or more modules described herein, and/or in the form of electronic circuitry.

Referring to FIG. 3, for the method 300, at block 302, the method may include analyzing, by a computer system comprising a physical processor, each packet of a plurality of packets 104 that are outgoing from and/or incoming to an entity 106 to respectively determine features within a sequence of outgoing packets and/or a sequence of incoming packets of the plurality of packets 104.

At block 304, the method 300 may include analyzing, by the computer system comprising the physical processor, the determined features by respectively using an outgoing packet classification model 110 and/or an incoming packet classification model 112.

At block 306, the method 300 may include classifying, by the computer system comprising the physical processor, based on the analysis of the features, a set of machine readable instructions 116 that is associated with the features as a type of machine readable instructions from a plurality of types of machine readable instructions 120.

According to examples, the method 300 may include analyzing, by the computer system comprising the physical processor, each packet of the plurality of packets 104 that are outgoing from and/or incoming to the entity 106 to respectively determine the features within the sequence of outgoing packets and/or the sequence of incoming packets of the plurality of packets 104 by analyzing, by the computer system comprising the physical processor, each packet of the plurality of packets 104 that are outgoing from and/or incoming to the entity 106 to respectively determine the features to further respectively determine outgoing protocol transitions for outgoing packets of the plurality of packets 104 from the entity 106, and/or incoming protocol transitions for incoming packets of the plurality of packets 104 to the entity 106.

According to examples, the method 300 may include analyzing, by the computer system comprising the physical processor, the determined features by respectively using the outgoing packet classification model 110 and/or the incoming packet classification model 112 by analyzing, by the computer system comprising the physical processor, the determined features by respectively using an outgoing protocol transition model related to the outgoing protocol transitions, and/or an incoming protocol transition model related to the incoming protocol transitions.

According to examples, the method 300 may include analyzing, by the computer system comprising the physical processor, each packet of the plurality of packets 104 that are outgoing from and/or incoming to the entity 106 to respectively determine the features within the sequence of outgoing packets and/or the sequence of incoming packets of the plurality of packets 104 analyzing, by the computer system comprising the physical processor, each packet of the plurality of packets 104 that are outgoing from and/or incoming to the entity 106 to respectively determine the features to further respectively determine destination port transitions for outgoing packets of the plurality of packets 104 from the entity 106, and/or source port transitions for incoming packets of the plurality of packets 104 to the entity 106.

According to examples, the method 300 may include analyzing, by the computer system comprising the physical processor, the determined features by respectively using the outgoing packet classification model 110 and/or the incoming packet classification model 112 by analyzing, by the computer system comprising the physical processor, the determined features by respectively using a destination port outgoing transition model related to the destination port transitions, and/or a source port incoming transition model related to the source port transitions.

According to examples, the method 300 may include analyzing, by the computer system comprising the physical processor, each packet of the plurality of packets 104 that are outgoing from and/or incoming to the entity 106 to respectively determine the features within the sequence of outgoing packets and/or the sequence of incoming packets of the plurality of packets 104 by analyzing, by the computer system comprising the physical processor, each packet of the plurality of packets 104 that are outgoing from and/or incoming to the entity 106 to respectively determine the features to further respectively determine destination IP address transitions for outgoing packets of the plurality of packets 104 from the entity 106, and/or source IP address transitions for incoming packets of the plurality of packets 104 to the entity 106.

According to examples, the method 300 may include analyzing, by the computer system comprising the physical processor, the determined features by respectively using the outgoing packet classification model 110 and/or the incoming packet classification model 112 analyzing, by the computer system comprising the physical processor, the determined features by respectively using a destination IP address transition model related to the destination IP address transitions, and/or a source IP address transition model related to the source IP address transitions.

According to examples, the method 300 may include generating, by the computer system comprising the physical processor, the outgoing packet classification model 110 and/or the incoming packet classification model 112 based on a training set of machine readable instructions.

According to examples, the method 300 may include analyzing, by the computer system comprising the physical processor, each packet of the plurality of packets 104 that are outgoing from and/or incoming to the entity 106 to respectively determine the features within the sequence of outgoing packets and/or the sequence of incoming packets of the plurality of packets 104 by analyzing, by the computer system comprising the physical processor, each packet of the plurality of packets 104, at a location that is independent of the entity 106, to respectively determine the features within the sequence of outgoing packets and/or the sequence of incoming packets of the plurality of packets 104.

Referring to FIG. 4, for the method 400, at block 402, the method may include analyzing each packet of a plurality of packets 104 that are outgoing from and/or incoming to an entity 106 to respectively determine features within a sequence of outgoing packets and/or a sequence of incoming packets of the plurality of packets 104 to further respectively determine an attribute related to the features.

At block 404, the method may include analyzing the determined features by respectively using an outgoing packet classification model 110 and/or an incoming packet classification model 112.

At block 406, the method may include classifying, based on the analysis of the features, an application that is associated with the features as a type of application from a plurality of types of applications.

According to examples, the method 400 may include classifying, based on the analysis of the features, the application that is associated with the features as the type of application from the plurality of types of applications by classifying, based on the analysis of the features, the application that is associated with the features as the type of application from the plurality of types of applications that include an authorized application and an unauthorized application.

According to examples, for the method 400, the attribute related to the features may include a count, a probability, or an entropy related to the features.

Referring to FIG. 5, for the method 500, at block 502, the method may include analyzing each packet of a plurality of packets 104 that are outgoing from and/or incoming to an entity 106 to respectively determine features within a sequence of outgoing packets and/or a sequence of incoming packets of the plurality of packets 104.

At block 504, the method may include analyzing the determined features by respectively using an outgoing packet classification model 110 and/or an incoming packet classification model 112.

At block 506, the method may include classifying, based on the analysis of the features, an application that is associated with the features as a type of application from a plurality of types of applications.

At block 508, the method may include determining, based on the classification of the application that is associated with the features as the type of application from the plurality of types of applications, whether to implement corrective measures related to the application.

According to examples, the method 500 may include in response to a determination to implement the corrective measures related to the application, implementing the corrective measures related to the application to modify further features within a further sequence of outgoing packets and/or a further sequence of incoming packets of a plurality of further packets 104.

According to examples, the method 500 may include classifying, based on the analysis of the features, the application that is associated with the features as the type of application from the plurality of types of applications by classifying, based on the analysis of the feature transitions, the application that is associated with the features as the type of application from the plurality of types of applications as an authorized application or as malware.

Figure 6:
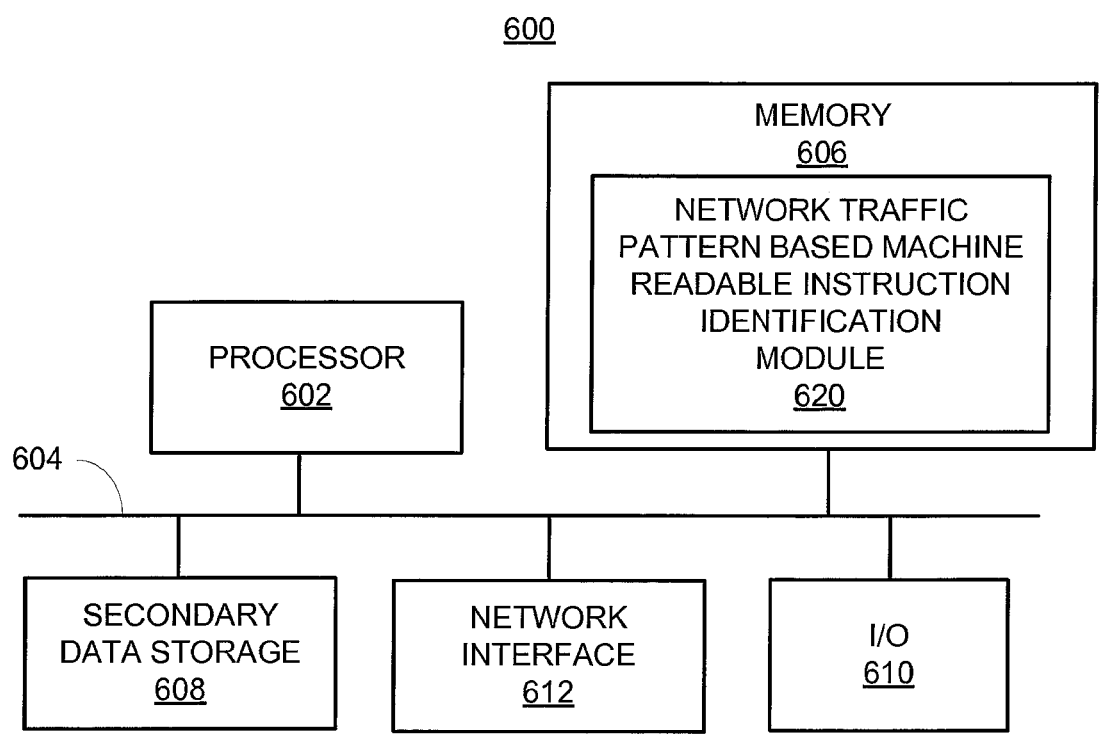
FIG. 6 illustrates a computer system, according to an example of the present disclosure.

FIG. 6 shows a computer system 600 that may be used with the examples described herein. The computer system 600 may represent a generic platform that includes components that may be in a server or another computer system. The computer system 600 may be used as a platform for the system 100. The computer system 600 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 may include a processor 602 that may implement or execute machine readable instructions performing some or all of the methods, functions and other processes described herein. Commands and data from the processor 602 may be communicated over a communication bus 604. The computer system may also include a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include a network traffic pattern based machine readable instruction identification module 620 including machine readable instructions residing in the memory 606 during runtime and executed by the processor 602. The network traffic pattern based machine readable instruction identification module 620 may include the modules of the system 100 shown in FIG. 1.

The computer system 600 may include an I/O device 610, such as a keyboard, a mouse, a display, etc. The computer system may include a network interface 612 for connecting to a network. Other known electronic components may be added or substituted in the computer system.

The foregoing disclosure describes a number of examples for network traffic pattern based machine readable instruction identification. The disclosed examples may include systems, devices, computer-readable storage media, and methods for network traffic pattern based machine readable instruction identification. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A method for network traffic pattern based machine readable instruction identification, the method comprising:
    analyzing, by a computer system comprising a physical processor, each packet of a plurality of packets that are at least one of outgoing from and incoming to an entity to respectively determine features within at least one of a sequence of outgoing packets and a sequence of incoming packets of the plurality of packets;
    analyzing, by the computer system comprising the physical processor, the determined features by respectively using at least one of an outgoing packet classification model and an incoming packet classification model;
    classifying, by the computer system comprising the physical processor, based on transitions of values of the determined features within at least one of the sequence of outgoing packets and the sequence of incoming packets of the plurality of packets and based on probabilities that the determined features will transition from one particular value to another particular value, a set of machine readable instructions that is associated with the determined features as a type of machine readable instructions from a plurality of types of machine readable instructions; and
    determining, based on the classification of the set of machine readable instructions, whether to implement corrective measures related to the set of machine readable instructions.

2. The method according to claim 1, wherein analyzing, by the computer system comprising the physical processor, each packet of the plurality of packets that are at least one of outgoing from and incoming to the entity to respectively determine the features within the at least one of the sequence of outgoing packets and the sequence of incoming packets of the plurality of packets further comprises:
    analyzing, by the computer system comprising the physical processor, each packet of the plurality of packets that are at least one of outgoing from and incoming to the entity to respectively determine the features to further respectively determine at least one of
        transitions of communication protocols of outgoing packets of the plurality of packets from the entity from one communication protocol to another communication protocol, and
        transitions of communication protocols of incoming packets of the plurality of packets to the entity from one communication protocol to another communication protocol.

3. The method according to claim 2, wherein analyzing, by the computer system comprising the physical processor, the determined features by respectively using the at least one of the outgoing packet classification model and the incoming packet classification model further comprises:
    analyzing, by the computer system comprising the physical processor, the determined features by respectively using at least one of
        an outgoing protocol transition model related to the transitions of the communication protocols of the outgoing packets, and
        an incoming protocol transition model related to the transitions of the communication protocols of the incoming packets.

4. The method according to claim 1, wherein analyzing, by the computer system comprising the physical processor, each packet of the plurality of packets that are at least one of outgoing from and incoming to the entity to respectively determine the features within the at least one of the sequence of outgoing packets and the sequence of incoming packets of the plurality of packets further comprises:
    analyzing, by the computer system comprising the physical processor, each packet of the plurality of packets that are at least one of outgoing from and incoming to the entity to respectively determine the features to further respectively determine at least one of
        transitions of destination ports of outgoing packets of the plurality of packets from the entity from one destination port to another destination port, and
        transitions of source ports of incoming packets of the plurality of packets to the entity from one destination port to another destination port.

5. The method according to claim 4, wherein analyzing, by the computer system comprising the physical processor, the determined features by respectively using the at least one of the outgoing packet classification model and the incoming packet classification model further comprises:
    analyzing, by the computer system comprising the physical processor, the determined features by respectively using at least one of
        a destination port outgoing transition model related to the transitions of the destination ports of the outgoing packets, and
        a source port incoming transition model related to the transitions of the source ports of the incoming packets.

6. The method according to claim 1, wherein analyzing, by the computer system comprising the physical processor, each packet of the plurality of packets that are at least one of outgoing from and incoming to the entity to respectively determine the features within the at least one of the sequence of outgoing packets and the sequence of incoming packets of the plurality of packets further comprises:
- analyzing, by the computer system comprising the physical processor, each packet of the plurality of packets that are at least one of outgoing from and incoming to the entity to respectively determine the features to further respectively determine at least one of
  - transitions of destination Internet Protocol (IP) addresses of outgoing packets of the plurality of packets from the entity from one IP address to another IP address, and
  - transitions of source IP addresses of incoming packets of the plurality of packets to the entity from one IP address to another IP address.

7. The method according to claim 6, wherein analyzing, by the computer system comprising the physical processor, the determined features by respectively using the at least one of the outgoing packet classification model and the incoming packet classification model further comprises:
- analyzing, by the computer system comprising the physical processor, the determined features by respectively using at least one of
  - a destination IP address transition model related to the destination IP address transitions, and
  - a source IP address transition model related to the source IP address transitions.

8. The method according to claim 1, further comprising:
generating, by the computer system comprising the physical processor, the at least one of the outgoing packet classification model and the incoming packet classification model based on a training set of machine readable instructions.

9. The method according to claim 1, wherein analyzing, by the computer system comprising the physical processor, each packet of the plurality of packets that are at least one of outgoing from and incoming to the entity to respectively determine the features within the at least one of the sequence of outgoing packets and the sequence of incoming packets of the plurality of packets further comprises:
- analyzing, by the computer system comprising the physical processor, each packet of the plurality of packets, at a location that is independent of the entity, to respectively determine the features within the at least one of the sequence of outgoing packets and the sequence of incoming packets of the plurality of packets.

10. A network traffic pattern based application identification system comprising:
- at least one processor; and
- a memory storing machine readable instructions that when executed by the at least one processor cause the at least one processor to:
- analyze each packet of a plurality of packets that are at least one of outgoing from and incoming to an entity to respectively detect transitions of communication protocols from one particular communication protocol to another particular communication protocol within at least one of a sequence of outgoing packets and a sequence of incoming packets of the plurality of packets;
- analyze the detected transitions of the communication protocols by respectively using at least one of an outgoing packet classification model and an incoming packet classification model to determine a probability for each transition of the detected transitions of the communication protocols;
- classify, based on the determined probability for each transition of the detected transitions of the communication protocols, an application that is associated with the detected transitions of the communication protocols as a type of application from a plurality of types of applications that include an authorized application and an unauthorized application; and
- determine, based on the classification of the application, whether to implement corrective measures related to the application.

11. A non-transitory computer readable medium having stored thereon machine readable instructions to provide network traffic pattern based application identification, the machine readable instructions, when executed, cause at least one processor to:
- analyze each packet of a plurality of packets that are at least one of outgoing from and incoming to an entity to respectively detect transitions of communication protocols from one particular communication protocol to another particular communication protocol within at least one of a sequence of outgoing packets and a sequence of incoming packets of the plurality of packets;
- analyze the detected transitions of the communication protocols by respectively using at least one of an outgoing packet classification model and an incoming packet classification model to determine a probability for each transition of the detected transitions of the communication protocols;
- classify, based on the determined probability for each transition of the detected transitions of the communication protocols, an application that is associated with the detected transitions of the communication protocols as a type of application from a plurality of types of applications that include an authorized application and an unauthorized application; and
- determine, based on the classification of the application, whether to implement corrective measures related to the application.

* * * * *